US007562289B2

(12) United States Patent
Bufkin et al.

(10) Patent No.: US 7,562,289 B2
(45) Date of Patent: Jul. 14, 2009

(54) METHODS AND SYSTEMS FOR ENCODING GEOGRAPHIC COORDINATES AND FEATURES IN A PORTABLE DOCUMENT FORMAT FILE

(75) Inventors: Michael P. Bufkin, Atlanta, GA (US); George G. Demmy, Atlanta, GA (US); D. Alan Stewart, Atlanta, GA (US)

(73) Assignee: Layton Geo-Science, Inc., Atlanta, GA (US)

( * ) Notice: Subject to any disclaimer, the term of this patent is extended or adjusted under 35 U.S.C. 154(b) by 878 days.

(21) Appl. No.: 10/871,964

(22) Filed: Jun. 18, 2004

(65) Prior Publication Data

US 2005/0034062 A1 Feb. 10, 2005

Related U.S. Application Data

(60) Provisional application No. 60/479,546, filed on Jun. 18, 2003.

(51) Int. Cl.
*G06F 17/00* (2006.01)
(52) U.S. Cl. .................. 715/211; 715/230; 715/232; 715/233
(58) Field of Classification Search ................ 715/200, 715/211, 230, 232, 233, 246
See application file for complete search history.

(56) References Cited

U.S. PATENT DOCUMENTS

| | | | | |
|---|---|---|---|---|
| 5,166,789 | A | | 11/1992 | Myrick |
| 5,214,757 | A | * | 5/1993 | Mauney et al. ............... 715/751 |
| 5,559,707 | A | * | 9/1996 | DeLorme et al. ............ 701/200 |
| 5,689,717 | A | * | 11/1997 | Pritt ............................ 715/234 |
| 5,699,255 | A | | 12/1997 | Ellis et al. |
| 6,202,065 | B1 | | 3/2001 | Wills |
| 6,266,094 | B1 | | 7/2001 | Taylor, Jr. |
| 6,282,362 | B1 | | 8/2001 | Murphy et al. |
| 6,321,158 | B1 | * | 11/2001 | DeLorme et al. ............ 701/201 |
| 6,336,074 | B1 | | 1/2002 | Woo |
| 6,370,629 | B1 | | 4/2002 | Hastings et al. |

(Continued)

OTHER PUBLICATIONS

Fox, L. et al. "computer Analysis of Landsat, Tharmatic Mapper Imagery and Existing Road Locations for Elk Habitat Mapping in Northern California." AIP Conference Proceedings, 1996; Issue 361//PT3; pp. 1529-1534.

(Continued)

*Primary Examiner*—Gregory J Vaughn
(74) *Attorney, Agent, or Firm*—DLA Piper LLP US

(57) ABSTRACT

The invention is methods and systems for encoding geographic coordinates and features in a portable document format file. Various embodiments of the invention permit encoding of a geographic relationship between the coordinate system of a digital source map, and the rendering of that map to a portable document format (PDF) document as well as the information required to transform between the source map coordinate system and the PDF coordinate system. This encoding can be performed by determining the coordinates of the points of a polygon of selected source map data to be rendered to PDF in both PDF coordinates and source coordinates, and by determining a transformation matrix to convert the coordinates from one system to the other, including information regarding the geometric projection of the source coordinate system. Having encoded this data, it can be possible to obtain any location within the rendered PDF file in coordinates of the source coordinate system.

24 Claims, 8 Drawing Sheets

U.S. PATENT DOCUMENTS

| | | | |
|---|---|---|---|
| 2002/0011941 A1* | 1/2002 | Endo et al. | 340/995 |
| 2002/0047895 A1 | 4/2002 | Bernardo et al. | |
| 2002/0072849 A1* | 6/2002 | Endo et al. | 701/211 |
| 2003/0182052 A1* | 9/2003 | DeLorme et al. | 701/201 |
| 2003/0197626 A1* | 10/2003 | Endo et al. | 340/995.1 |

OTHER PUBLICATIONS

Burkholder, E. F. "3D Coordinates—A Universal Rectangular Coordinate System for a GIS and Other Spatial Databases." Computing in Civil Engineering -Congress -1994; 1st; pp. 233-240.

Yihua Hu et al., Improving the Quantification of Georeferenced Images in the Airborne Scanning Laser Ranging-Imaging Sensor (ASLRIS), Proceedings of SPIE, vol. 4130, pp. 13-20 (2000).

M.L. Arushanov, "A Simple Model of Geographic Conjunction for Low Resolution Scanner Images to Provide High Accuracy", Issledovanie Zemli iz Kosmosa, vol. 3, pp. 41-46 (1993), with English language abstract.

Timothy A. Benson, "Geolocation of an Electromagnetic Emitter Using a Cyclostationary Time Difference of Arrival Technique", NS368219 Naval Postgraduate School, Monterey, CA, Report No. AD-A261781, 81 pages, Dec. 17, 1992, Mark A. Sither, Spatial Data Transformation: Feature Attribute Conversion issues and Practical Experience, A0457462 Army Engineer Topographic Labs, Fort Belvoir, VA, Report No. AD-A254829, 12 pages, Mar. 1991.

Alexander Sonnenschein et al., "Geolocation of Frequency-Hopping Transmitters via Satellite", IEEE Transactions on Aerospace and Electronic Systems, vol. 29, No. 4, pp. 1228-1236, Oct. 1993.

Kurt W. Hess et al., "Geographic Display of Circulation Model Data", Technical Report for National Oceanographic Data Center, Washington, DC, Aug. 1989, 48 pgs.

Abstract of V.I. Solov'ev et al., "Geographic referencing and computer-aided construction of Coordinate grids for images obtained with the Cosmos-1500 satellite", Methods and facilities for the processing of satellite-acquired hydrometeorology data (A90-48376 22-47), Leningrad, Gidrometeoizadat, pp. 132-141 (1988).

Charles H. Larcomb, "Spatial Registration of TIROS-N Weather Satellite Data", Master's Thesis, ADA216041, Air Force Inst. of Tech., Wright-Patterson AFB, Oh. School of Engineering, Dec. 1989, 94 pgs.

Franz Leberl et al., "A Smart, Mapping, Charting and Geodesy Control Generator. Phase 1", Final Report ADA188184, Vexcell Corp, Boulder, CO, Mar. 1987, 74 pgs.

Albert J. Fleig et al., "Geolocation of Data From the Earth Observing System's MODIS Instrument: An Analysis of Location Accuracy", IEEE International Geoscience and Remote Sensing Symposium (IGARSS), vol. 1, pp. 129-131 (1995).

Earl F. Burkholder, "Design of a Local Coordinate System for Surveying, Engineering, and LIS/GIS", Surveying and Land Information Systems, vol. 53, No. 1, pp. 29-40 (1993).

Peter J. Melvin et al., "Geolocation Accuracy for Hercules on STS 53", Advances in the Astronautical Sciences Series, Part 1, vol. 85, pp. 297-316 (1994).

Sami Lais, "The Power of Location: Does Your Data Know Where it is?", Computerworld, vol. 36, No. 16, pp. 48, Apr. 15, 2002.

P. Beni, "TIROS-N/NOAA Satellite Image Pixel to Geographical Coordinates Reciprocity Determination Method", Technical Reports: Instituto di Ricerca Sulle Onde Elettromagnetiche. Consiglio Nazionale Delle Ricerche, 44 pages, Mar. 1988, with English bibliographic data.

R.P. Wiles et al., "Video Georegistration: Algorithm and Quantitative Evaluation", Proceedings of Eighth IEEE International Conference on Computer Vision, 8 pages (2001).

M. Potmesil, "Maps Alive: Viewing Geospatial Information on the WWW", Computer Networks and ISDN Systems, 17 pages (1997).

Yihua Hu et al., "A Study on the Precision of the Georeferenced Acquired by Remote Sensing", SPIE, vol. 3505, pp. 144-150 (1998).

GeoTIFF Format Specification, GeoTIFF Revision 1.0, printed Dec. 19, 2008 from http://www.remotesensing.org/geotiff/spec/geotiffhome.html, 90 pages, Last Modified Dec. 28, 2000.

Goodchild, Michael F. "Towards a Geography of a Geographic Imformation in a Digital World." National Center for Geographic Imformation and Analysis, and Department of Geography, University of California, USA. 1998, pp. 377-392.

* cited by examiner

METHODS AND SYSTEMS FOR ENCODING GEOGRAPHIC COORDINATES AND FEATURES IN A PORTABLE DOCUMENT FORMAT FILE

RELATED APPLICATIONS

This application claims the benefit of U.S. Provisional Application No. 60/479,546 entitled "Methods and Systems for Encoding Geographic Coordinates and Features in an Adobe Portable Document File," filed on Jun. 18, 2003, which is incorporated herein by reference.

FIELD OF THE INVENTION

The invention generally relates to cartography and the publishing of maps. More particularly, the invention relates to methods and systems for encoding geographic coordinates and features in a portable document format file.

BACKGROUND OF THE INVENTION

With the introduction of interactive computer graphics in the 1960s, the field of cartography made significant advances in both quality and productivity. Digital-type methods began to be used for gathering map data, and processing it to more accurately model terrain and geographic features. For example, systems and methods could be used to digitize data representing terrain and geographic features, and then the terrain and features could be stored as a "digital source map." The digital source map could then be output to a mechanical printing device, such as a color printer. However, the information stored in a digital source map was limited since the annotation and manipulation of digitized data for map finishing was limited until the advent of graphical editing programs such as Intergraph's IGDS in 1972, Autodesk's AutoCAD in 1982 and Adobe Systems' Photoshop in 1985. These types of products allowed users to use computer systems to produce paper maps that were of comparable quality to hand drawn maps.

A further improvement in the use of computers in mapping was the development of Graphical Information Systems, or GIS, based on work at The Harvard Lab for Computer Graphics in the mid 1970's. The first commercial GIS was ESRI's ARC/INFO, released in 1982. GIS allowed the inclusion into digital source maps of significant amounts of non-graphic information about terrain and geographical features as well as positional information based on accurate cartographical methods beyond those of earlier CAD based systems. The non-graphic information and positional information could be stored in a digital map as "objects." In GIS, objects were said to be geo-registered, since the objects were associated with a specific position in the digital source map. Thus GIS users could obtain much more information about the terrain and geographical features associated with respective objects displayed in these types of digital source maps than with terrain and features represented in earlier systems and methods of mapping.

The end product of both early CAD-based and GIS-based mapping systems were paper maps, which obviously could not display information other than that printed on the page. While the originals of these maps existed in computer files as digital source maps, which could be used to display objects associated with non-graphic information about terrain and geographical features shown on the paper maps, access to the digital source maps was limited to users with the appropriate proprietary software who were physically connected to a network containing the digital source map data. Although these digital map files could be copied to floppy disks or tapes for transferring to other users, these conventional systems and methods were too cumbersome for widespread and high-speed distribution. The emergence of high-speed networks, the Internet and the CD-ROM device in the 1990's extended user access to digital source map data outside the physical connectivity of the originator's network, but still required user access to a software package related to that of the original producer. Those users having such access were able to derive substantial additional value from digital source map data. For example, a user of Intergraph's Fieldview product could see both the position of a piece of equipment on a digital source map and display many attributes of the equipment, such as manufacturer, part number, installation date, voltage, phase, and status. However, this product required that the user acquire a specific and expensive software program along with a specific and expensive high performance computer and computer operating system. Its utility was further restricted by the need to distribute a complete and complex proprietary data set, rather than individual, cartographically complete map files.

In 1987, Adobe Systems introduced the portable document format (PDF) file structure and the associated viewer application program Adobe Acrobat®. These products allowed the conversion of almost any Microsoft Windows® compliant file structure to a single structure which retained the complete and faithful appearance of all the originals, regardless of their source. Aided by the availability of a free and robust viewing product, Acrobat Reader®, and the publication of the file format specification as an open standard, the PDF file format quickly became a defacto standard for electronic document publishing.

The PDF file format for drawing distribution provides a faithful, inviolable rendering, distributed electronically at very low cost, with significant work flow and security features. The PDF file format provides other features beyond these capabilities, some which may not be available in other distribution methods and systems, regardless of file format. Since the PDF file format is both an open format and a very rich structure that offers many ways to extend its functionality beyond mere viewing, there are functionalities that may exceed those available from the original source file.

For example, software can be used to convert native CAD files to PDF files. The software may be designed to enhance the basic PDF file format by including structures enabled by the PDF file specification which increase the utility of PDF files to engineering and mapping users. While the PDF file format allows for the distribution of digital source maps electronically without the need for appropriate viewing software, hardware or operating system, it has been limited to the graphics or digitized map images only. Users of maps frequently have a need to determine the position of an object in one of many different geographical coordinate systems. For example, a military user may desire to communicate the position of a target located on a map by determining its latitude and longitude in the World Geodetic System. With paper maps, this can be done through a manual method of measuring the scaled offset of a point from a known landmark, then adding that value to the documented coordinates of the landmark. Since prior digital source maps in the PDF file format or other file format are merely graphical images of the digital source map, and the electronic maps in PDF file format did not allow for the inclusion of geo-registered data or provide an accurate determination of the position of objects shown on the digital source map, there was no way of automatically determining the coordinates of an arbitrarily selected point in an arbitrarily selected coordinate system.

The PDF file format allows the embedding of annotations and hyperlinks within the file. Annotations can contain annotation information such as any sequence of text and numbers, while the hyperlinks can perform any number of functions common to computer systems. For example, a hyperlink can move the viewing position to another part of the image, open another image for display, or invoke another computer program. The content of annotation information associated with an annotation can include information about an object depicted in the map, and this information may exist in an external database along with the coordinates of the location of the item in one of many coordinate systems. For example, a database entry can include the manufacturer, part number, installation date, voltage, phase, and status of a piece of equipment. However, no prior systems or methods existed for embedding these annotations and hyperlinks in the PDF file format using their geographic coordinates.

Another useful functionality of the PDF file format is the ability to render text strings from a native file as text strings within a corresponding PDF file, thus preserving the native font characteristics. Thus, all text within the PDF file may become fully searchable. This allows for a set of PDF files to be cataloged, enabling full text searching over a very large set of drawings, using the cataloging function. This text searchability can even be extended to internet or intranet web searching, so that documents exposed to the Internet or World Wide Web (WWW) can be located using web search engines like Google™. However, the text searchability for digital source maps stored in a PDF file format has not been fully utilized by conventional mapping systems and methods.

These and other drawbacks of systems and methods utilizing a graphics file format such as the PDF file format are illustrated by at least one prior patent, U.S. Pat. No. 6,336,074 to Woo. Woo relates to a database of maps stored in a portable document format (PDF) file. The PDF file can be accessible using a mobile navigation system with a global positioning system (GPS) receiver. Each PDF file can be independent of any hardware, software and operating system used to create it. However, Woo does not appear to allow for the inclusion of geo-registered data or provide an accurate determination of the position of objects shown on a digital source map.

Furthermore, Woo relates to providing descriptions of documents including any combination of text, graphics, and images in a device-independent and resolution-independent format. In accordance with Woo, a PDF file can contain graphics and hypertext links or information. Hypertext accesses of data can be communicated from the GPS receiver to a map and hypertext database. When a hypertext link or information is called upon, the map and hypertext database can return a point-of-interest name and a map coordinate location. While Woo's method does extend the ability of a user to obtain information regarding points of interest on a map, it accomplishes this in such a way as to place major restrictions on the user. The method described can allow for the construction of a graphic representing a local area map that includes a set of points-of-interest; composing special text and details related to said points-of-interest in a hypertext file; and encapsulating said map graphics and hypertext information in a portable document format (PDF) file. However, the method does not allow the user to determine coordinates of arbitrarily selected points on the map, nor does it allow for the transformation of points from one coordinate system to another. Furthermore, the method of relating the hypertext to the points-of-interest is not related to their geographic coordinates in an arbitrarily selected coordinate system. Finally, Woo's method requires that the user have access to a mobile navigation system that includes a GPS navigation receiver.

Therefore a need exists for methods and systems for encoding and rendering geographic coordinates and features in a graphics-type file format such as a portable document format (PDF) file enabling the creation of a self-contained, general purpose cartographical document which is independent of a particular hardware platform or computer operating system for its use.

Another need exists for methods and systems for annotating geographic coordinates and features in a graphics-type file format such as a portable document format (PDF) file.

Yet another need exists for methods and systems for cross-referencing a database using an annotation embedded in a graphics-type file format such as a portable document format (PDF) file.

SUMMARY OF THE INVENTION

Various embodiments of the invention address some or all of the above issues and combinations thereof. They do so by providing methods and systems for encoding and rendering geographic coordinates and features in a graphics-type file format such as a portable document format (PDF) file. At least one example method and system provide a user with the ability to publish maps as PDF files with the self contained ability to quickly and easily locate items of interest within the map, including positional information such as latitude and longitude.

One aspect of an embodiment of the invention focuses on a method for encoding geographic information from a digital source map to an electronic graphics file, and associating non-graphic information from the digital source map with a geographic position in the electronic graphics file. The method can include receiving geographic information associated with a digital source map, and scaling the geographic information to render corresponding geographic information in an associated electronic graphics file. The method can also include generating an annotation associated with non-graphic information, and storing the annotation in the electronic graphics file, wherein the annotation is associated with a geographic position in the electronic graphics file. Furthermore, the method can also include when the annotation is selected, displaying the non-graphic information associated with the geographic position.

Another aspect of an embodiment of the invention focuses on a method for viewing encoded geographic information within an electronic graphics file. The method can include receiving an electronic graphics file with geographic information, the electronic graphics file. The electronic graphics file can include scaled geographic information from a digital source map, wherein the scaled geographic information is geo-registered, and an annotation associated with the geographic information, the annotation providing access to non-geographic information stored in an associated database. The method can also include accessing the electronic graphics file with an application program adapted to display the electronic graphics file. Accessing the electronic graphics file with an application program adapted to display the electronic graphics file can include selecting the annotation, wherein non-geographic information is displayed adjacent to the geographic information when the electronic graphics file is displayed.

Another aspect of an embodiment of the invention includes a computer-readable medium for encoding geographic information of a digital source map to an electronic graphics file, and associating geographic information in the electronic graphics file with non-geographic information in a database. The computer-readable medium can include a mapping engine adapted to scale geographic information in a digital source map for rendering corresponding geographic information in an electronic graphics file, and generate an annotation for the geographic information in the electronic graphics file. The computer-readable medium can also include when the annotation is selected, access a database with non-geographic information associated with geographic information of the digital source map.

Objects, features and advantages of various systems, methods, and apparatuses according to various embodiments of the invention include:

(1) Methods and systems for encoding and rendering geographic coordinates and features in a graphics-type file format such as a portable document format (PDF) file;

(2) Methods and systems for annotating geographic coordinates and features in a graphics-type file format such as a portable document format (PDF) file; and (3) Methods and systems for cross-referencing a database using an annotation embedded in a graphics-type file format such as a portable document format (PDF) file.

Other objects, features and advantages of various aspects and embodiments according to the invention are apparent from the other parts of this document.

DETAILED DESCRIPTION OF SPECIFIC EMBODIMENTS

Figure 1:
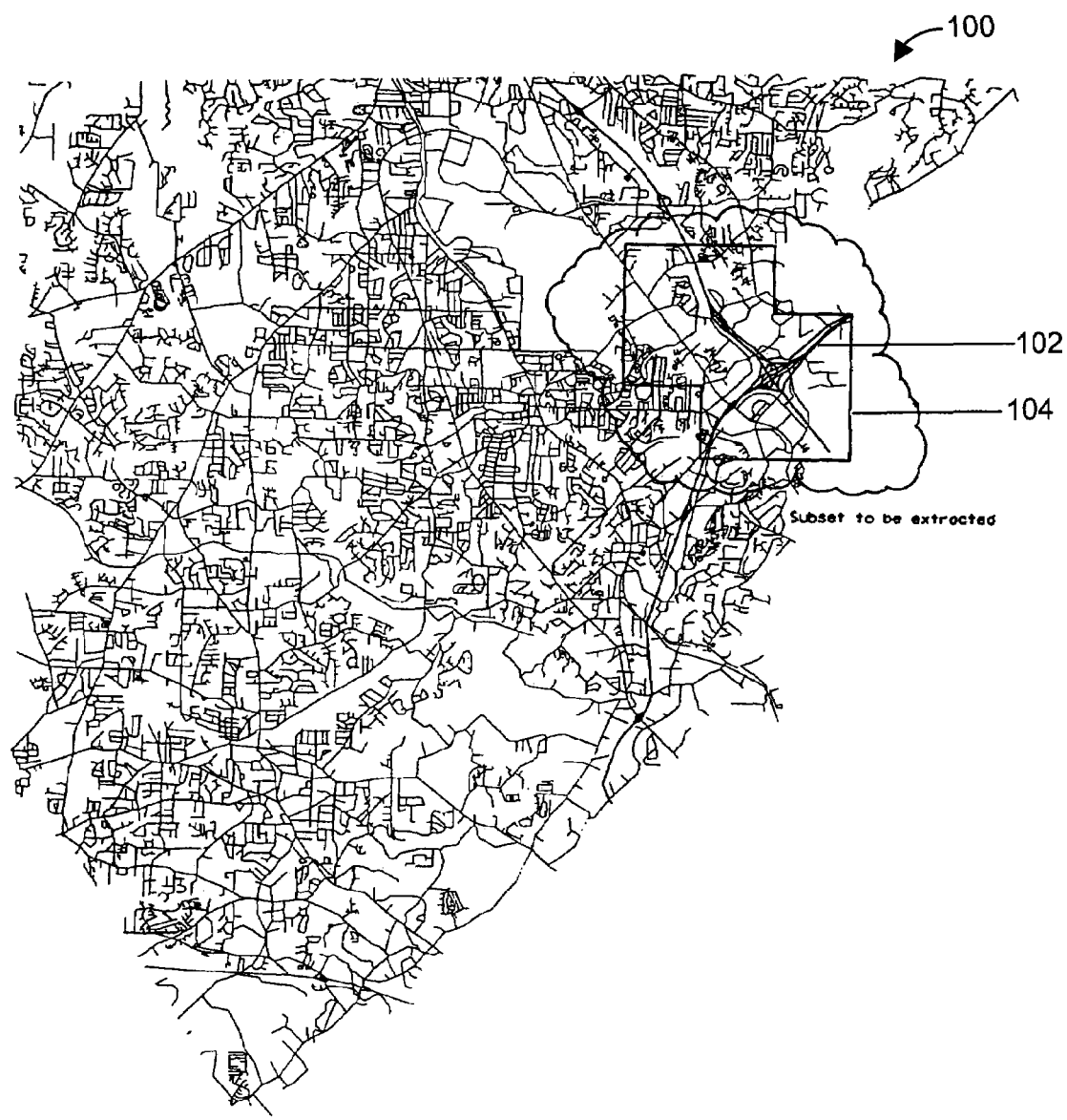
FIG. 1 depicts a digital source map and a subset of source map data to be extracted in accordance with an embodiment of the invention.

Various embodiments of the invention address some or all of the above issues and combinations thereof. They do so by providing methods and systems for encoding and rendering geographic coordinates and features in a graphics-type file format such as a portable document format (PDF) file. Further, they do so by providing methods and systems for annotating geographic coordinates and features in a graphics-type file format such as a PDF file. Moreover, they do so by providing methods and systems for cross-referencing a database using an annotation embedded in a graphics-type file format such as a PDF file.

Encoding and rendering geographic features and coordinates into a graphics-type file format such as a PDF file or another electronic graphics file format can allow for the inclusion of geographic information, such as geo-registered data from a digital source map, into a self-contained, useful digital file format. Geo-registered data stored in a self-contained, useful digital file format can provide many advantages. Geo-registered data can accurately portray the real world positions of terrain and geographic features. By providing this geo-registered data available to users in a self-contained, useful digital file format, numerous users and applications can quickly and can easily use geographical information stored in digital maps, including positional information such as latitude and longitude. Geographical information can include, but is not limited to, longitude, latitude, elevation, terrain features, geographic coordinates, geographic features, geographic objects, roads, bodies of water, mountains, places, and land masses.

By way of example, a graphics-type file format such as a PDF file format can provide a faithful rendering of the native file which can be distributed to users and consumers without the need of additional supporting files such as font libraries, reference files, color or weight tables, or any proprietary software. In particular, the security features provided by the PDF file format can secure the document against alteration, thus ensuring that the document which is viewed by the recipient can be identical in every way to that of the provider, for example, a critical requirement for contract documents. Finally, because the Adobe Viewer software can be freely obtained, and because almost all personal computer (PC) users are familiar with its use, the cost of viewing documents stored in the PDF file format can be virtually zero, both in software costs, maintenance costs and training costs. Other types of graphics-type file formats can be used in accordance with various embodiments of the invention. Such files or formats can include, but are not limited to, Autodesk's Design Web Format (DWF), Tagged Image File Format (TIF), Scalable Vector Graphics (SVG), Bentley Digital InterPlot (DPR), HyperText Markup Language (HTML), Extensible Markup Language (XML), and other electronic graphics files or formats.

Annotating geographical features and coordinates in a graphics-type file format such as a PDF file can allow non-geographical information to be quickly and easily associated with items of interest within a digital map. Annotations associated with geographic features and coordinates stored in a graphics-type file format can permit the graphics files to include text that can be searched or accessed by a search engine. Non-geographical information can include, but is not limited to, textual information, non-graphic information, names, business names, addresses, phone numbers, cities, states, and a description of a location.

By way of example, the existence of searchable text within a graphics-type file format such as the PDF file format can permit automated creation of hyperlinks and bookmarks when the text strings can be accurately located within the geometry of the PDF coordinate system. To accomplish this, embodiments of the invention can define and control the PDF geometry at creation. Embodiments of the invention can define an accurate mapping between the PDF coordinate system and the digital source map file coordinate system. As a result, for example, if a map object such as a geographical feature is located at a particular X-Y axis position within the digital source map file, its position within the PDF coordinate system can be determined and vice-versa.

Cross-referencing a database using an annotation embedded in a graphics-type file format such as a portable document format (PDF) file can be useful for accessing other geographical and non-geographical information associated with a map object. Knowing the exact position of a map object within a graphics-type file format such a PDF file can be a powerful resource for users. For example, in the case of text string positions, it can allow the placement of a hyperlink precisely over the text. If the text can be associated with a particular file, then a hyperlink to the file can be created automatically. This association of text strings to file names can be accomplished using a simple database which relates drawing references to the actual file name containing the drawing. For example, a table in a database can be:

TABLE 1

| Hyperlink Text | File | Map |
| --- | --- | --- |
| Water tower | Reference coordinates for water tower | Lat/long for water tower |
| Recreation Center | Reference coordinates for recreation center | Lat/long for recreation center |

In addition to hyperlinking to related drawings, a knowledge of the position of an object in the native file, and its relative position in the PDF file, can be exploited for many other purposes. For example, if a particular object, such as a recreation center, has an entry in a database table, the link between the database entry and the geometric object can be used to allow an automatic zoom to the recreation center by selecting it from a list contained in a set of associated bookmarks. By way of another example, if the database entry contains non-geographical information, an annotation or similar type annotation containing that data can be embedded at the exact location of the object. A user with an input device, such as a mouse, can click on the object and can then access and display the data, or otherwise invoke a query to the real time or other type of database. For example, non-geographical information for a point of interest, such as a textual description associated with a recreation center, can be retrieved from a corresponding database entry for a recreation center in a digital source map.

There can be several other advantages of this type of controlled geometry. Embedding a scale ratio between the original and PDF files can allow the accurate measurement of distances, angles and areas, enabling automated quantity take off from PDF files. The availability of scale and size can also allow the preservation of zoom level when moving between two different PDF files. In cases where a seamless view of several PDF files is needed, size and scale can be used to create a superimposition of multiple PDF files, wherein the superimposition can be the overlap of a portion of the PDF files such as the overlap of corresponding map boundaries illustrated within the PDF files.

Given a geometric structure within the PDF file, it is then possible to encode geo-location information as metadata, rendering the PDF into a useful GIS document. Certain map-related projects can contain a structure for defining the latitude and longitude of a particular monument point within the PDF file, along with such other critical data as projection and datum. This data can allow for the determination of the latitude and/or longitude (lat/long) or northing and easting of any point within the PDF file. It also can allow for the determination of the particular PDF file containing a specific lat/long and the zooming to that point. These PDF files then become an apparatus or device for geo-locating any item drawn within the map reproduced in the file.

Turning now to the attached drawings, reference numerals in the specification will refer to particular details of the drawings. FIGS. 1-5 illustrate various geographical coordinates and features from a digital map that can be extracted and rendered to a graphics file-type format or an electronic graphics file such as a PDF file in accordance with an embodiment of the invention. An example embodiment of the invention is shown as a system 800 in FIG. 8. A software application program module 806, such as a geographic information encoding engine, can encode and display geographical coordinates and features in an electronic graphics file such as a PDF file 826. Processes and methods associated with the software application program module 806 are illustrated and described in FIGS. 6 and 7. By way of example, four application programs can be associated with the software application program module 806 and are described herein as "PDF_Proc," "PDF_Render," "GEO_Display," and "Attribute_Display", and shown as 806a, 806b, 806c, and 806d, respectively in the system 800 shown in FIG. 8. While these application programs may be described with respect to processing a PDF file, one skilled in the art will recognize the applicability of the systems, methods, and processes disclosed herein as being applicable to all suitable electronic graphics files and graphical file-type formats.

The application programs 806, 806a, 806b, 806c, and 806d can accomplish a number of tasks which are demonstrated by reference to the accompanying drawings. Note that fewer or greater numbers of application programs 806, 806a, 806b, 806c, and 806d and associated modules can be used in accordance with various embodiments of the invention. Furthermore, the routines or methods embodied in the application programs 806, 806a, 806b, 806c, and 806d and associated modules can also be configured as a series of hardware apparatus or devices and/or combination of software and hardware-type apparatus or devices.

FIG. 1 depicts an example of a display of a digital source map 100 with source map data 102. A digital source map 100 is a digital map, or a map in a digital format. Source map data 102 can include geographical and non-geographical features. Non-geographical features can include, but is not limited to, non-graphic information, textual information associated with a geographical feature, or other non-graphic information associated with a geographical feature. Source map data 102 shown in FIG. 1 can include digital data representing geographical features and coordinates associated with a digital map. The digital source map 100 can include, but is not limited to, a computer-aided design (CAD) drawing, a Geographic Information Systems (GIS) land base, a raster-based image, and a map in a digital format. If the source map data 102 in the digital source map 100 is stored in a non-Cartesian system, portions of the source map data 102 can be projected to a Cartesian system, such as UTM (Universal Transverse Mercator) or State Plane, before conversion to a PDF file format. In any instance, some part of the source map data 102 can be selected for rendering to a PDF file format. For example, a user operating an input device, such as a mouse, associated with a client device (shown as 818, 820 in FIG. 8) can select a portion of the source map data 102. Boundaries of the source map data 102 to be rendered can be defined by any shape such as an arbitrary polygon, in the example shown in FIG. 1, a polygon 104. As shown in FIG. 1, the polygon 104 can encompass a particular set 106 of the source map data 102. Note that a polygon 104 is an arbitrary enclosure or a predefined portion of source map data 102 from a digital source map 100. The purpose of a polygon 104 is to designate a particular subset of source map data 102 to be manipulated or otherwise processed by an embodiment of the invention.

Figure 8:
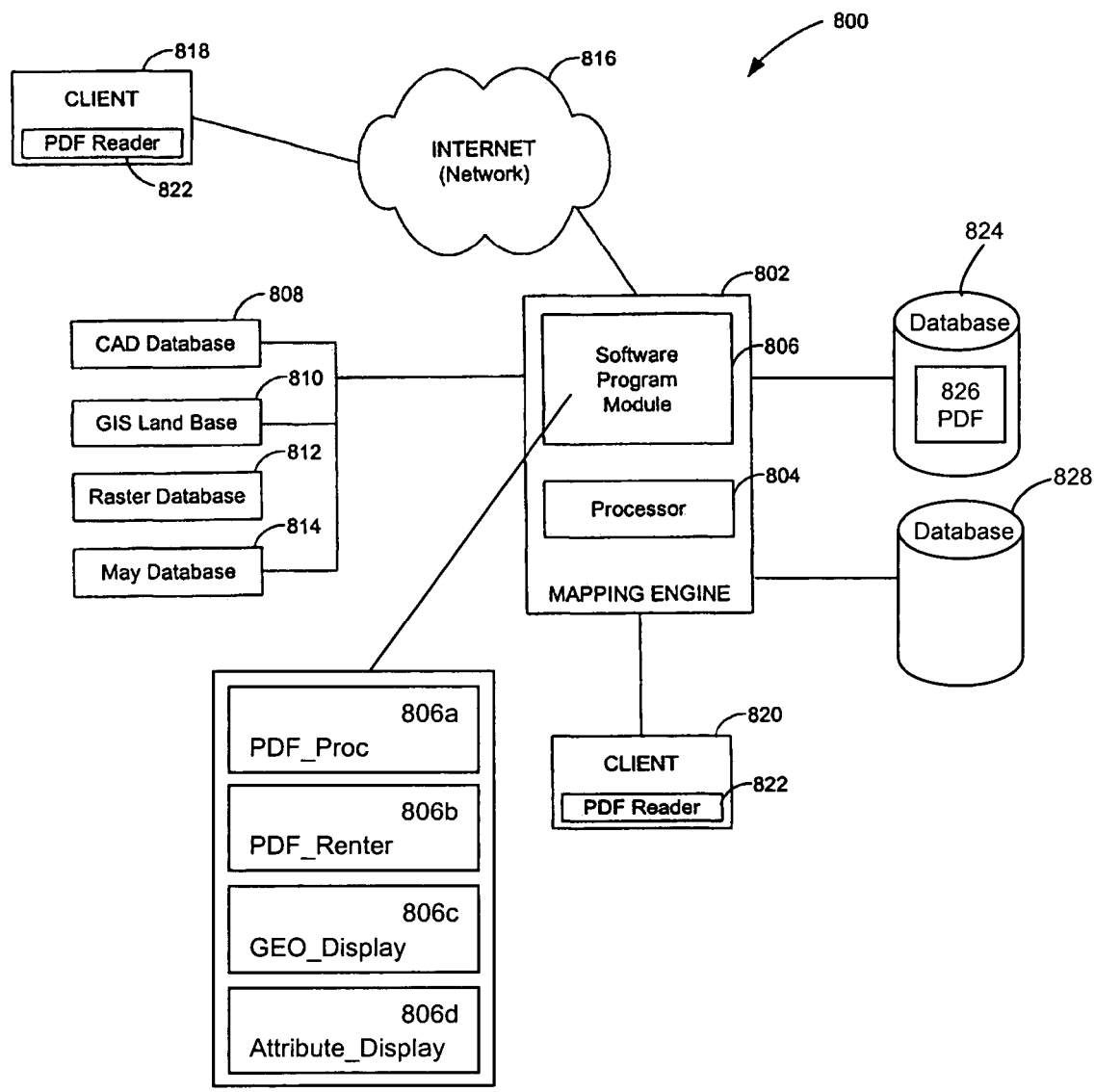
FIG. 8 is an illustration of a system for encoding geographic coordinates and features within an electronic graphics file in accordance with various embodiments of the invention.

In the embodiment shown in FIG. 8, an application program such as PDF_Proc 806a, can extract source map data 102 from a digital source map 100. For example, source map data of interest can be defined within a polygon, such as 104 shown in FIG. 1.

Figure 2:
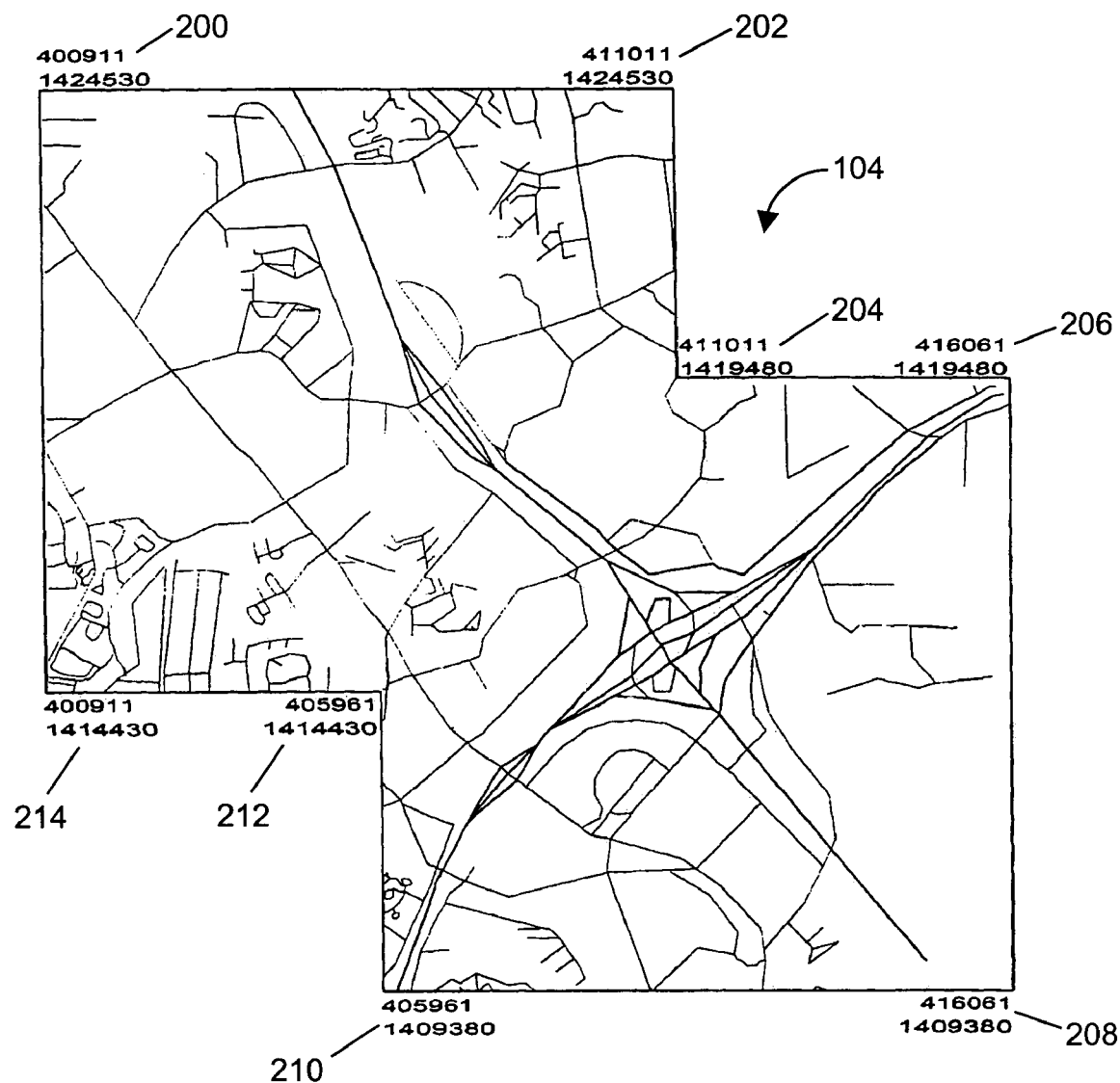
FIG. 2 depicts the extracted subset of FIG. 1 with bounding points defined in accordance with an embodiment of the invention.

FIG. 2 illustrates a display of the selected source map data from FIG. 1, in accordance with an embodiment of the invention. Continuing from the example above, PDF_Proc 806a can determine geographic coordinates of associated points of the polygon 104, expressed as coordinate pairs. For example as shown in FIG. 2, each point of the polygon 104 can be associated with X-Y coordinate pairs 200, 202, 204, 206, 208, 210, 212, 214 shown in FIG. 2. Coordinate pairs 200, 202, 204, 206, 208, 210, 212, 214 can be expressed in at least one of several coordinate systems, for example, UTM northing and easting (latitude and longitude). In a example embodiment, the coordinate pairs 200, 202, 204, 206, 208, 210, 212, 214 can be contained within an associated table stored in a memory or an associated database, which can allow the extraction of some or all sets of coordinate pairs 200, 202, 204, 206, 208, 210, 212, 214 corresponding to corners of the polygon 104 from a particular digital source map 100.

In the embodiment shown in FIG. 8, PDF_Proc 806a or an associated application program can also search one or more separate databases of non-graphic attributes of objects displayed within one or more of the maps or digital source maps, so long as one of the attributes of the object is the location expressed in the geographic coordinate system of the map or digital source map. In most cases, the application program such as PDF_Proc 806a can search an associated memory or at least one database which contains a description of the cartographic method used to produce the map or digital source map, specifically the projection and datum used. "Projection" is defined as a mathematical model that transforms the locations of features on the Earth's surface to locations on a two-dimensional surface. "Datum" is defined as a set of parameters and control points used to accurately define the three-dimensional shape of the Earth.

Figure 3:
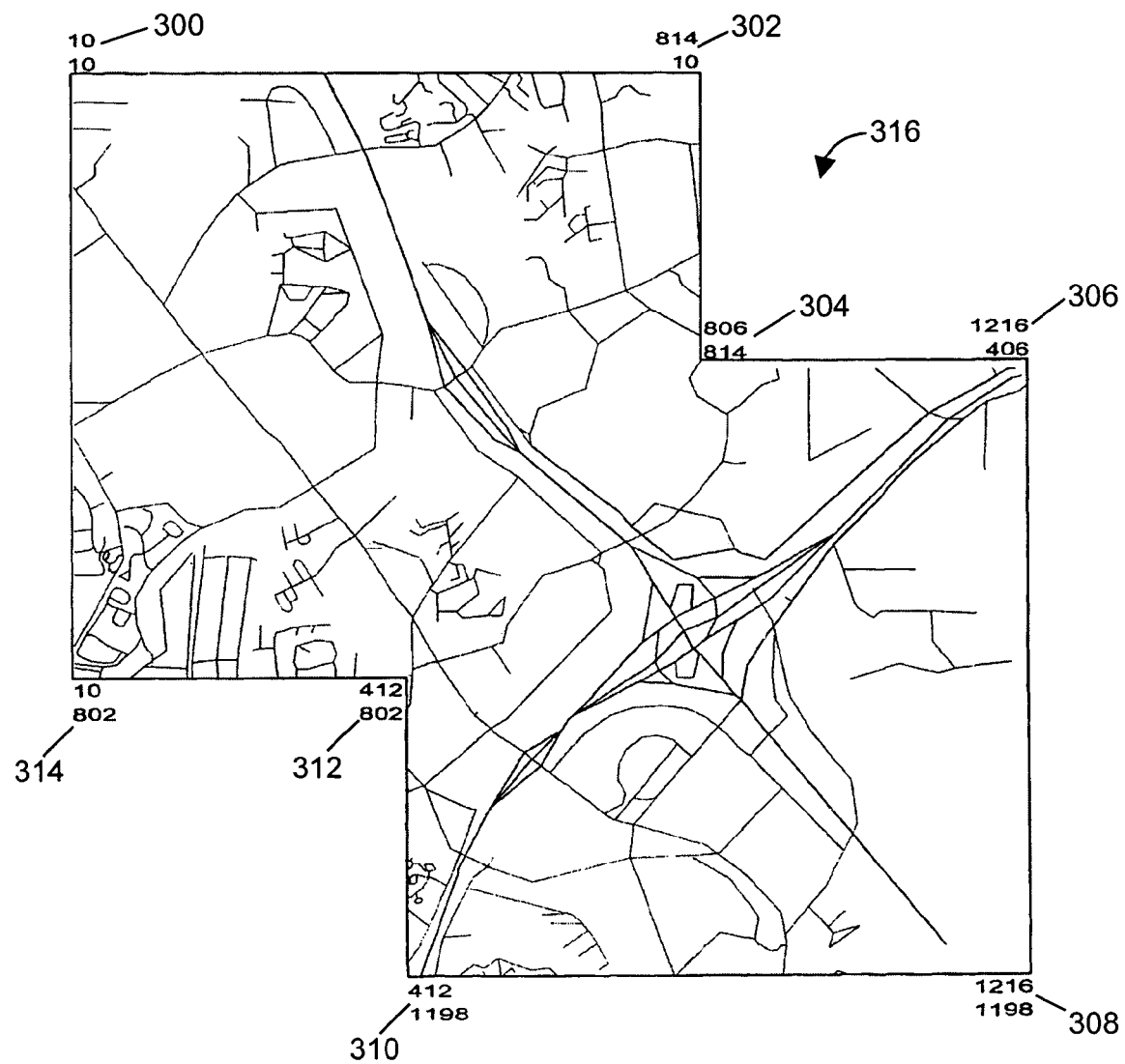
FIG. 3 depicts the subset of FIG. 2 rendered to an electronic graphics file in accordance with an embodiment of the invention.

FIG. 3 illustrates a display of an electronic graphics file rendered from selected source map data shown in FIG. 2, in accordance with an embodiment of the invention. Continuing from the example above, the PDF_Proc application program 806a can call to PDF_Render 806b or another associated application program to convert the selected source map data 102 to a suitable file format. For example as shown in FIG. 3, PDF_Render 806b can convert coordinates of the selected source map data 102 in polygon 104 to coordinate pairs associated with a format for a particular electronic graphics file, such as PDF coordinate pairs 300, 302, 304, 306, 308, 310, 312, 314 for a rendered PDF graphic 316. PDF_Proc 806a can then write a dictionary entry, such as GEODict, to the rendered electronic graphics file associated with the rendered PDF graphic 316. The dictionary entry can contain associated data such as Projection, and a matrix such as "ProjectionToPDF." The matrix can be a three by three transformation matrix which enables the conversion of coordinates from a particular digital source map, such as the coordinate pairs 200, 202, 204, 206, 208, 210, 212, 214 for digital source map 100, to coordinates for a particular electronic graphics file, such as the coordinate pairs 300, 302, 304, 306, 308, 310, 312, 314 for the rendered PDF graphic 316. By inversion of the matrix, coordinates for the electronic graphics file can be converted back to coordinates for the digital source map 100 as described in Table 2 below. In one embodiment, a separate memory or associated database, such as 828 in FIG. 8, of non-graphic attributes of objects displayed within the digital source map 100 can be available to PDF_Proc 806a or another application program. In such an embodiment, PDF_Proc 806 can write annotations containing textual or non-graphic attributes of objects at the coordinates of the electronic graphics file, such as coordinate pairs 300, 302, 304, 306, 308, 310, 312, 314 for the rendered PDF graphic 316, corresponding to the coordinates of the digital source map 100.

TABLE 2

Example of a GEODict

/LGIDict
GIS data will be contained in an PDF Dictionary type, such as LGIDict or GEODict.
This dictionary
can be contained in an indirect object. The core set of data can
contain the following entries.
/LGIDict          Value of/Type key
/CTM              Transformation matrix mapping projection to PDF
/Neatline         Boundary of geographic information in PDF coordinates
/Projection       Dictionary containing projection information
/Display          Dictionary containing display preferences information
/Version          LGIDict version
/Registration     Array of coordinate registration points.
** Descriptions
Data:
NUMBER: A number, either an Adobe fixed-point number, or a string
    representation.
/CTM (required):
    Description: Transformation matrix mapping projection coordinates
        to PDF coordinates. Adobe CTM format using
    Value type: Array of six NUMBERS
/Projection (optional):
    Description: Description of projection strategy used to produce the
        map.
    Value type: Dictionary (/Type /Projection)
/Display (optional):
    Description: Description of display preferences.
    Value type: Dictionary (/Type /Projection)
/Neatline (optional):
    Description: bounding box (in clockwise order) of the map in PDF
        user space coordinates. May be simple two-point
        lower left -- upper right style bounding box.
    Value type: Array of NUMBERS
/Version (required):
    Description: LGIDict version code.
    Value type: String
    Note: Matching strings is reliable and flexible.
/Registration (optional):
    Description: Pairs of coordinate pairs registering PDF to map or
        geodetic coordinates.
    Value type: Array of arrays containing four NUMBERS.
    Note: Must contain at least two pairs. These points correspond to
        the CTM.
    Ordering: [ PDFX PDFY GEOX GEOY ]

As described in Table 2 above, the GeoDict dictionary entry, or another suitable dictionary entry such as LGIDict, can be extended to embed different kinds of geospatial information into an electronic graphics file format such as PDF, including but not limited to, the projection from the real world (such as UTM and State Plane) to PDF. In this manner, a conversion between an electronic graphics file format, such as PDF, and the "real world" position of terrain or a geographical feature in a digital source map 100 can be achieved.

Note that data from the GeoDict or another suitable dictionary entry can be referenced as an indirect object anywhere in the page tree of a file, such as the Root node of the PDF (catalog), page nodes, or page leafs. The GeoDict or another suitable dictionary entry in the parent page can be inherited by the child page. However, the GeoDict or another suitable dictionary entry of the same type of projection in the child page can overwrite the one that is in the parent. The GeoDict or another suitable dictionary entry can be embodied in a plug-in application program as described below in FIG. 4, or another set of processor-executable instructions. An array of indirect objects can also be used for more than one GeoDict or another suitable dictionary entry.

Figure 4:
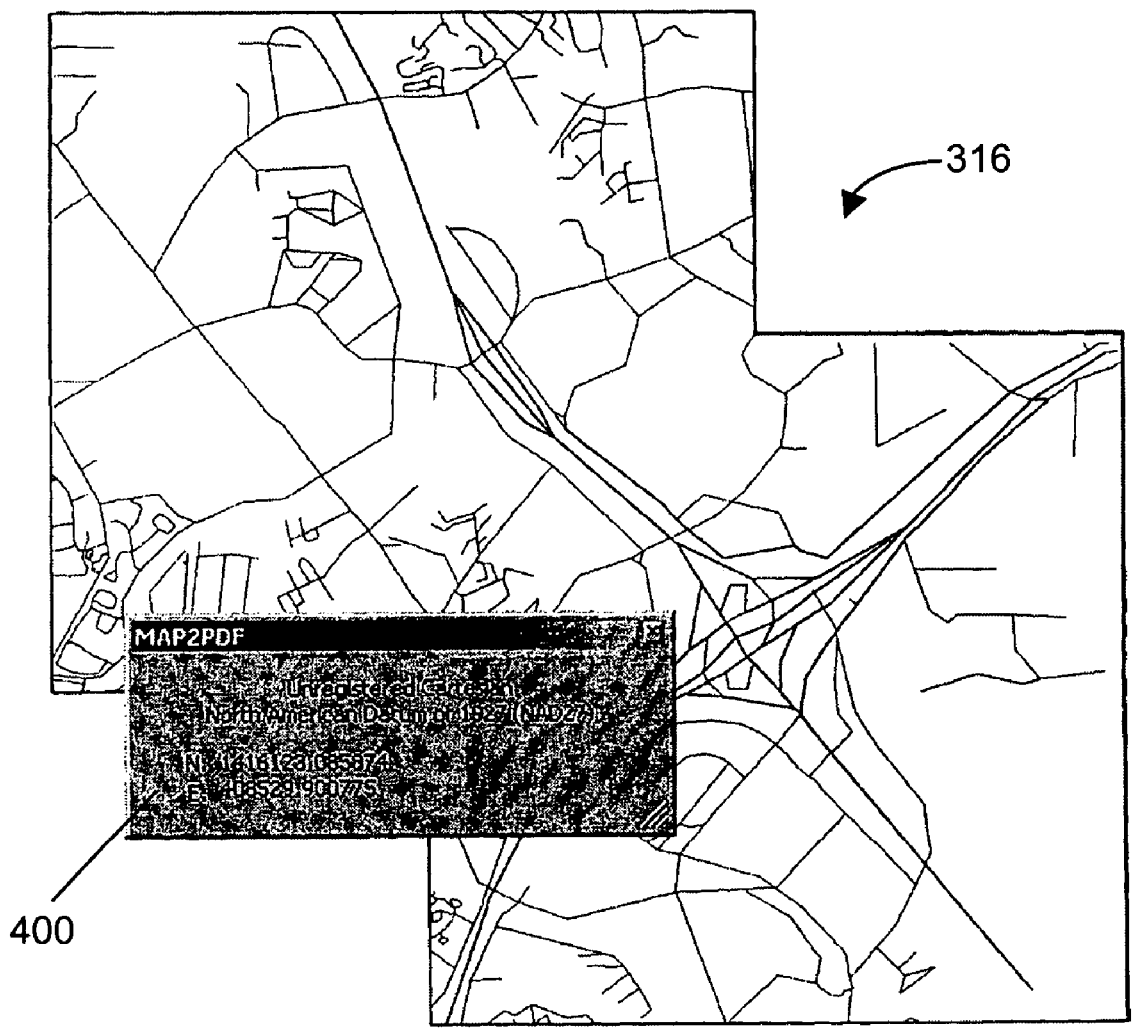
FIG. 4 depicts a particular set of coordinates displayed within the electronic graphics file of FIG. 3 in accordance with an embodiment of the invention.

FIG. 4 illustrates a transformation of a pair of coordinates for an electronic graphics file to coordinates associated with the digital source map as shown in FIG. 1, in accordance with an embodiment of the invention. Using the data from the GEODict or another suitable dictionary entry, Geo_Display 806c can transform the coordinates of any point in an electronic graphics file to coordinates associated with the digital source map 100. For example, FIG. 4 illustrates a transformation 400 of a set of PDF coordinates in the PDF file 316 to a set of State Plane coordinates, shown as "N: 1416123.085874 E: 408529.900775," associated with a corresponding point in the digital map source 100. In another embodiment, Geo_Display 806c can transform coordinates of the electronic graphics file to any other coordinate system for which a transformation algorithm is available. Geo_Display 806c can be a plug-in application program which runs in conjunction with the Adobe Systems Acrobat® and Acrobat Reader® programs.

Figure 5:
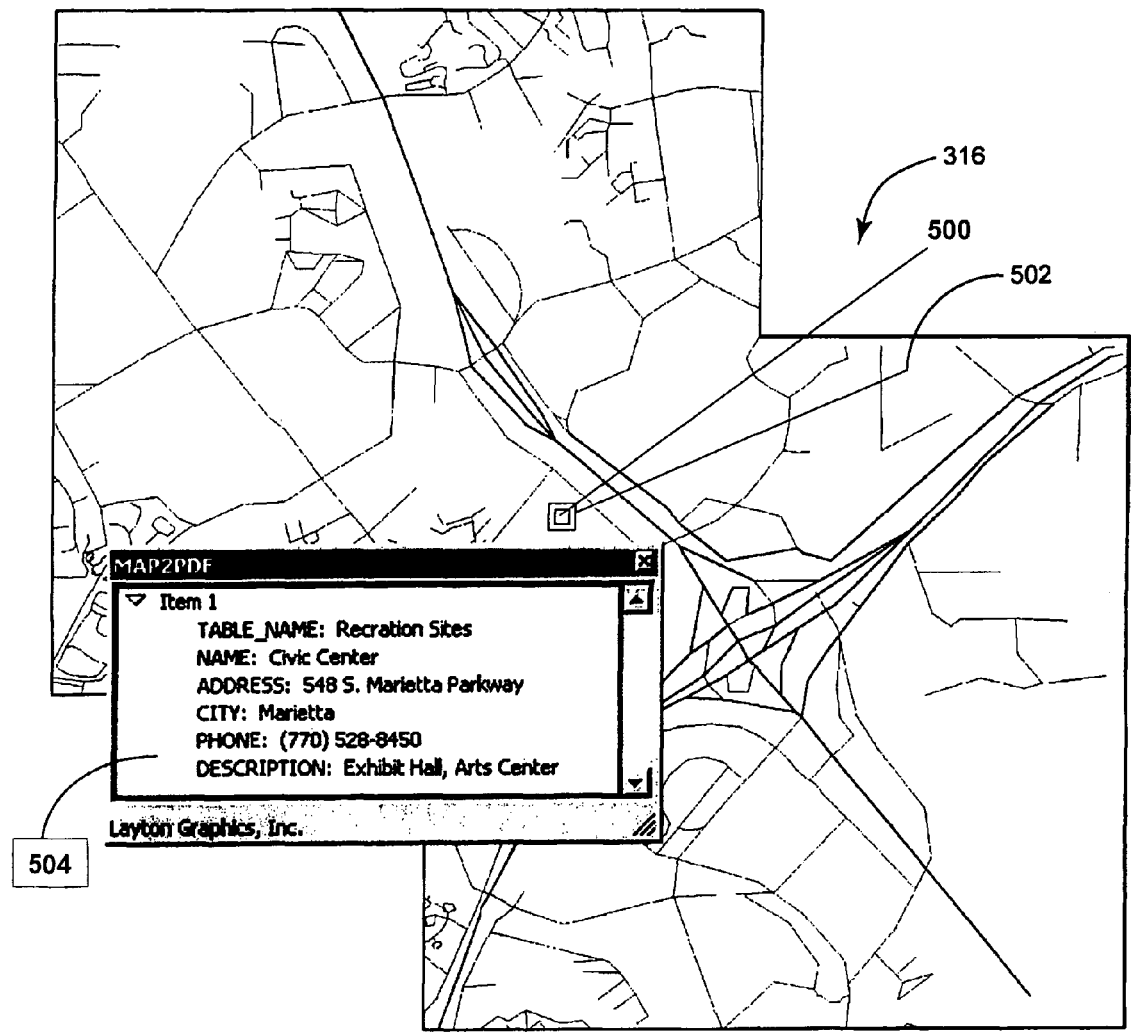
FIG. 5 depicts a display of an annotation associated with an object within the electronic graphics file of FIG. 4 in accordance with an embodiment of the invention.

FIG. 5 illustrates an annotation with associated non-geographic information shown for an electronic graphics file in accordance with an embodiment of the invention. If non-graphic information associated with geographic features and objects displayed within the digital source map 100 have been written to the rendered electronic graphics file with one or more annotations, the Attribute_Display 806d or another application program can be used to display those annotations and the associated non-graphic information. For example, a geographic object in a rendered PDF file can include an annotation with non-graphic information associated with the object. Note that a person skilled in the art will recognize the processes, methods, or devices needed to generate an annotation in a PDF file. For example, in the rendered PDF file 316 shown in FIG. 5, an icon 500 representing a geographical object such as a recreation center can be displayed. An associated annotation 502 can be generated and displayed by the Attribute_Display 806d over a corresponding portion of the icon 500 in the PDF file 316. When a selection of the annotation 502 is made by a user, such as an input from a mouse, the Attribute_Display 806d can retrieve associated non-graphic information from within the PDF file 316, such as annotation information for the icon 500 or recreation center, "TABLE_NAME: Recreation Sites, NAME: Civic Center, ADDRESS: 548 S. Marietta Parkway, CITY: Marietta, PHONE: (770) 528-8450, DESCRIPTION: Exhibit Hall, Arts Center" shown in FIG. 5. Annotation information can include geographical-type or non-geographical-type information such as name, business name, address, phone number, and a description of a location. Other types of information can be provided for an annotation or with annotation information. Attribute_Display 806d can be a plug-in application program which runs in conjunction with the Adobe Systems Acrobat® and Acrobat Reader® programs.

Figure 6:
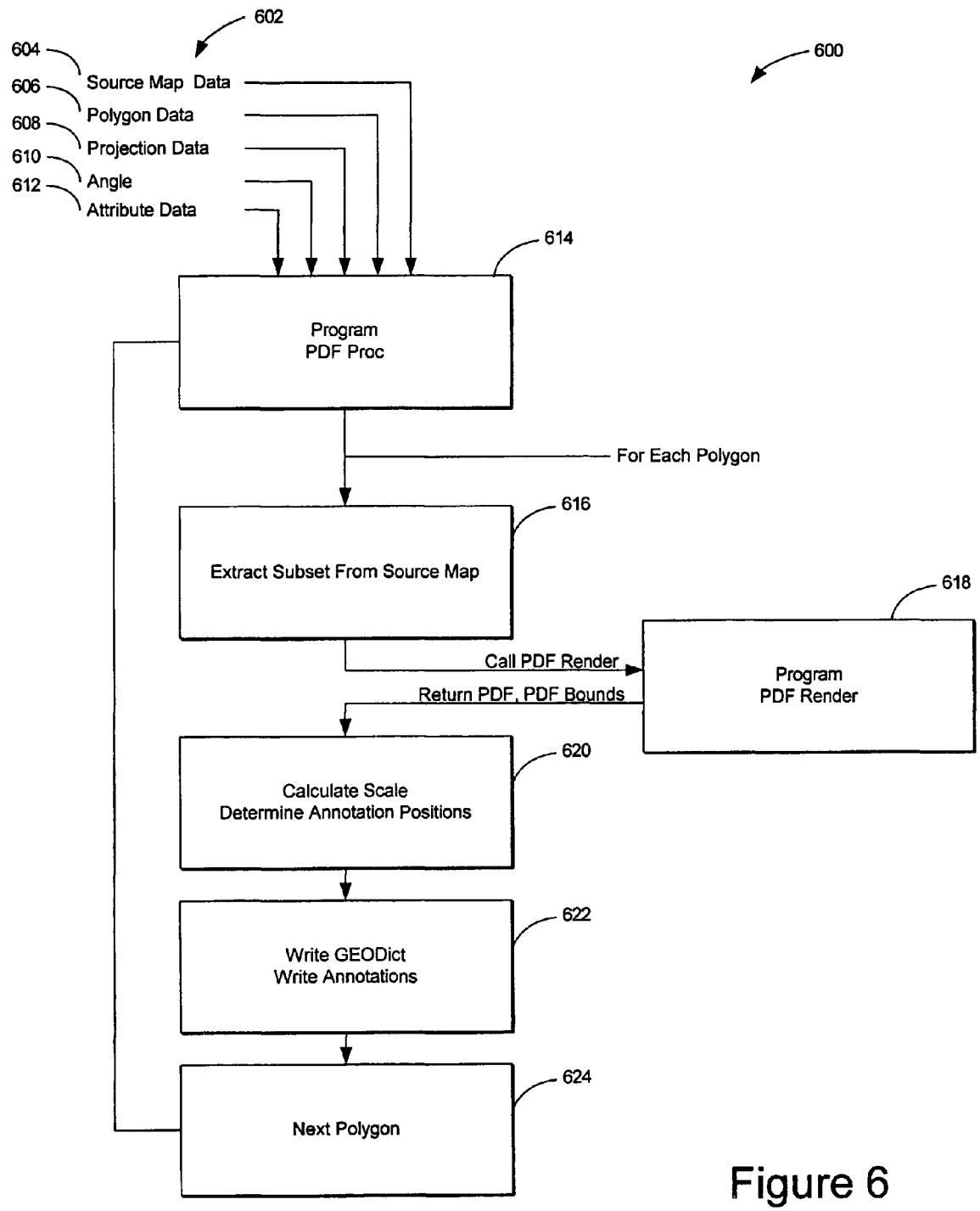
FIG. 6 is a flow diagram of a method for encoding geographic coordinates and features within an electronic graphics file in accordance with an embodiment of the invention.

FIG. 6 is a process flow diagram of a method 600 for encoding geographic coordinates and geographic or other desired features within an electronic graphics file in accordance with an embodiment of the invention. FIG. 6 specifically illustrates an interaction of the four application programs 806a, 806b, 806c, 806d associated with the software program module 806 to render the electronic graphics file, coordinates, and annotation shown in FIGS. 3-5. The order of the process described herein can be different than the embodiment shown in FIG. 6.

The method 600 begins at block 602, where various geographic information such as 604, 606, 608, 610, 612 are received or otherwise defined for input to PDF Proc 806a or another application program. The various geographic information can be obtained from a terrain model such as a digital source map 100 shown in FIG. 1. For example as shown in FIG. 6, source map data 604, polygon data 606, projection data 608, other data 610, and attribute data 612 are received or otherwise defined for input to PDF_Proc 806a. Other types of geographic information can be received or otherwise defined for input to PDF_Proc 806a or another application program with the illustrated method 600 or other processes in accordance with embodiments of the invention.

Source map data 604 can be data from a digital source map 100 as previously described in FIG. 1. Polygon data 606 can be data associated with a polygon 104 as previously described in FIG. 1. Projection data 608 can be data that portrays a location or area of interest on a predefined surface, such as data from a mathematical model that transforms the locations of features on the Earth's surface to locations on a two-dimensional surface. Other data 610 can include, but is not limited to, angle data or other data that describes the location or area of interest, such as an angle of a north/south axis in the digital source map. In one embodiment, other data 610 can optionally be used. Attribute data 612 can be data that describes characteristics of the location or area of interest such as textual or non-graphic data associated with a digital map, i.e. data associated with the annotation 500 shown in FIG. 5. Other types of data can be received or otherwise defined and used in accordance with various embodiments of the invention.

In one embodiment, any of the various geographic information 604, 606, 608, 610, 612 such as textual or non-graphic data can be stored in a non-graphics database 828 shown in FIG. 8.

Block 602 is followed by block 614, in which the various geographic information can be processed. In the embodiment shown in FIG. 6, PDF_Proc 806a or another application program can receive the various input data 604, 606, 608, 610, and 612 for processing. For example, various geographic information 604, 606, 608, 610, and 612 can be associated with a particular selection of source map data from a digital source map, such as by a user selection of a polygon 104 from a digital source map 100. Multiple polygons of selected source map data such as 104 can be handled and processed by PDF_Proc 806a or another application program.

Block 614 is followed by block 616, in which a subset of the various geographic information from a digital source map is selected or otherwise extracted for processing. In the embodiment shown in FIG. 6, only a selected portion of a digital source map 100 is defined for extraction, such as a user selection of particular source map data 102 (or selected source map data) within a polygon 104 shown in FIGS. 1 and 2. In this manner, a particular portion of a digital source map 100 can be iteratively processed, since a digital source map 100 can often cover a much larger area than needed for an individual map or series of maps. In this example, only a subset of the source map data 102 from the digital source map 100 is processed by the PDF_Proc 806a. Skilled persons in the art will recognize that other quantities and types of source map data such as terrain model data can be processed in accordance with various embodiments of the invention.

Block 616 is followed by block 618, in which PDF_Render 806b renders the selected various geographic information into a rendered graphic. In the embodiment shown in FIG. 6, PDF_Proc 806a can call to PDF_Render 806b, and submit the selected various geographic information to PDF_Render

806b for processing. Using the selected various geographic information, PDF_Render 806b can render the geographic information, such as selected source map data 102, to a format for an electronic graphics file, such as a graphic for a PDF file. Furthermore, PDF_Render 806b can determine corresponding coordinates of the rendered graphic in the format for the electronic graphics file, such as PDF coordinates for one or more boundaries of the selected source map data 102 within the polygon 104.

In one embodiment, PDF_Render 806b can store the rendered graphic in a database, memory, or other data storage device, such as a rendered PDF file 826 in database 824.

Block 618 is followed by block 620, in which scale is calculated, and annotation positions are determined. In the embodiment shown in FIG. 6, PDF_Proc 806a can determine a scale associated with the selected source map data and further associated with the rendered graphic. For example, PDF_Proc 806a can determine via a GEODict, or other dictionary entry, a ratio between the size of the polygon 104 and the size of the rendered graphic associated with the rendered data in the electronic graphics file. Ratios can be determined for various characteristics between the selected source map data 102 and the rendered graphic including, but not limited to, sizes of respective north/south axes, sizes of respective east/west axes, sizes of respective axes selected by a user.

By further way of example, PDF_Proc 806a can determine a unit of measure associated with the selected source map data 102, also associated with the digital source map 100 that the source map data 102 is selected from. Units of measure can include, but are not limited to, inches, feet, yards, meters, miles, kilometers, and any other unit measure of distance.

By way of further example, PDF_Proc 806a can optionally determine an angle between an axis of the source map data and an axis of the rendered data. For example, PDF_Proc 806a can determine an angle between a north/south axis in the source map data 102 and a north/south axis in the rendered graphic. The angle can be referred to as the "Angle."

By way of further example, PDF_Proc 806a can optionally determine a ratio between a size of an axis in the selected source data of a polygon and a size of an axis in the rendered graphic. For example, PDF_Proc 806a can determine a ratio between a north/south axis in the source map data 102 and a north/south axis in the rendered graphic. The ratio can be referred to as the "ScaleX."

By way of further example, PDF_Proc 806a can optionally determine another ratio between a size of another axis in the selected source data of a polygon and a size of another axis in the rendered graphic. For example, PDF_Proc 806a can determine a ratio between an east/west axis in the source map data 102 and an east/west axis in the rendered graphic. The ratio can be referred to as the "ScaleY."

Moreover, in the embodiment shown in FIG. 6, PDF_Proc 806a can determine a position within the graphic associated with the rendered data that corresponds to a point of interest in the selected source map data. PDF_Proc 806a can generate a corresponding annotation for the particular position or point of interest. For example, as described above in FIG. 5, a point of interest or icon 500 such as a recreation center can have particular geographic coordinates in the selected source map data. PDF_Proc 806a can determine corresponding coordinates in the graphic associated with the rendered data, wherein the corresponding coordinates correspond with the particular geographic coordinates in the selected source map data for the point of interest or icon 500. PDF_Proc 806a can generate an annotation for the particular point of interest or icon 500 in the rendered data. Further, PDF_Proc 806a can also determine that the point of interest or icon 500 is associated with non-graphic information, such as textual information associated with the point of interest. In the example of FIG. 5, the icon 500 such as the recreation center can have the following associated non-graphic information 504, "TABLE_ NAME: Recreation Sites, NAME: Civic Center, ADDRESS: 548 S. Marietta Parkway, CITY: Marietta, PHONE: (770) 528-8450, DESCRIPTION: Exhibit Hall, Arts Center." PDF_Proc 806a can determine a position, such as icon 500, in the graphic associated with the rendered data to associate the non-graphic or textual information, such as the corresponding coordinates of the point of interest or other non-graphic information such as 504. PDF_Proc 806a then generates an annotation 502 associated with the icon 500, such as highlighting the icon 500.

Block 620 is followed by block 622, in which a dictionary entry is written, and one or more annotations and associated annotation information are written and stored. In the embodiment shown in FIG. 6, PDF_Render 806b can generate or otherwise write a dictionary entry, to the rendered electronic graphics file, such as the dictionary entry "GEODict," shown in Table 2 above, within a PDF file. The dictionary entry can contain the various selected source map data 102, and other information determined or otherwise calculated as described above in blocks 618, 620, and 622. Examples of data stored in a dictionary entry can include, but are not limited to, a projection, projection parameters, a ProjectionToPDF matrix, a scale, a ratio, and units of measure for a digital source map. These and other types of data are defined and further described in the "GEODict" shown in FIG. 2.

In one embodiment, PDF_Render 806b can store the dictionary entry in a database, memory, or other data storage device, such as in the rendered PDF file 826 in database 824.

When the position and non-graphic information are determined for the graphic, PDF_Render 806b can generate an annotation as described in block 622 using location coordinates extracted from a non-graphics database such as 828. In this manner, a user interested in a particular point of interest in the graphic associated with the rendered data, can select the point of interest. If needed, GEO_Display 806c can retrieve coordinates of the particular point of interest from database 824, and display via a client device 818, 820 the coordinates associated with the particular point of interest. When needed, Attribute_Display 806d can retrieve the annotation from the rendered data or from database 828, and display via a client device 818, 820 the textual or non-graphic information associated with the point of interest.

Block 622 is followed by block 624, in which another subset or the next polygon of geographic information is iteratively processed, and the method 600 returns to block 614. In the embodiment shown, PDF_Proc 806a can process one particular polygon of selected source map data at a time until all polygons of selected source map data are processed. Blocks 614, 616, 618, 620, 622, and 624 can then be repeated as necessary until all or a pre-defined number of polygons or other selected source map data are processed by the method 600. When all of the polygons or other selected source map data have been processed by PDF_Proc 806a and PDF_Render 806b, then the method 600 ends.

Figure 7:
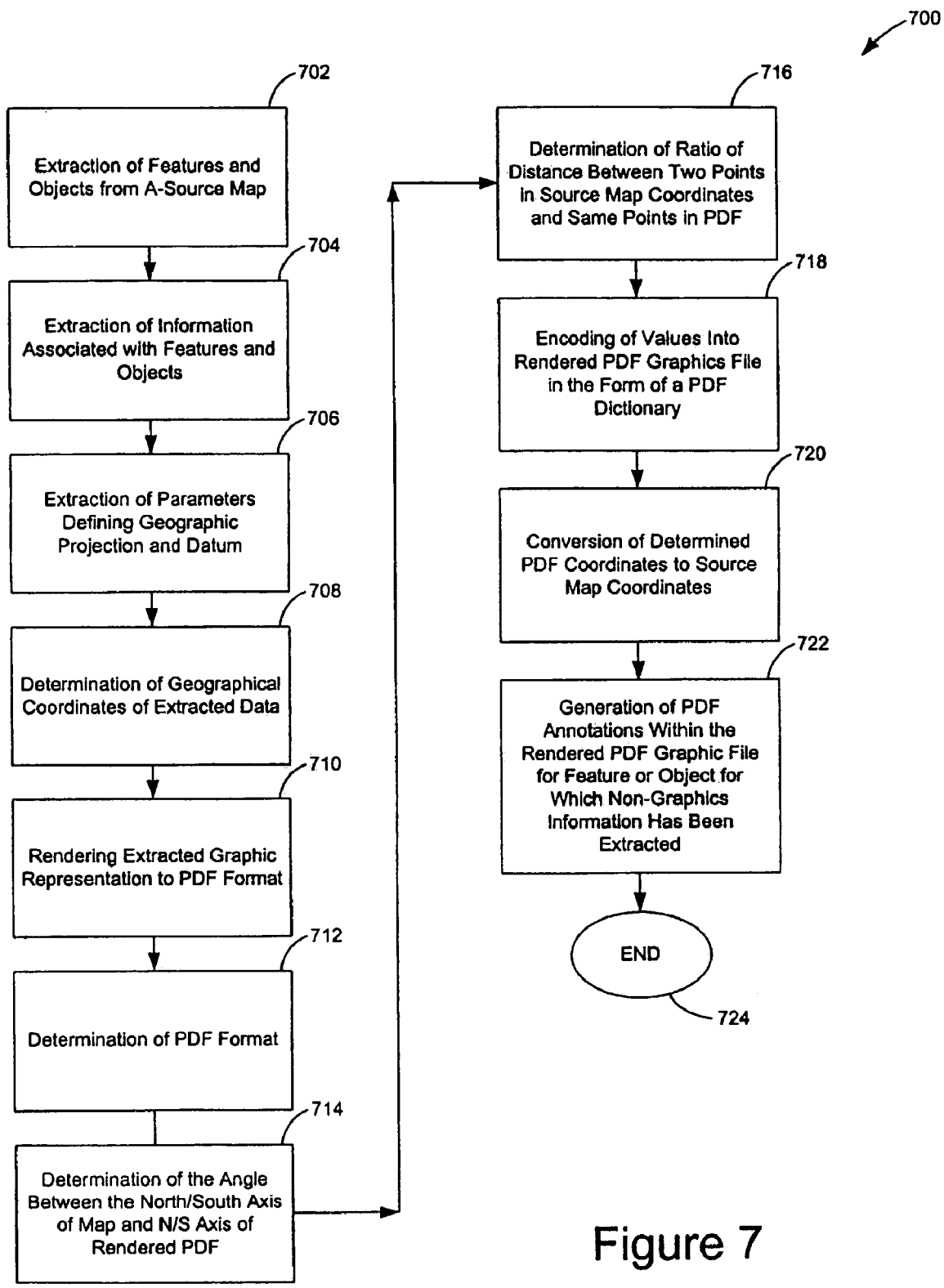
FIG. 7 is a flow diagram of another method for encoding geographic coordinates and features within a PDF file in accordance with an embodiment of the invention.

FIG. 7 illustrates a flowchart for a method in accordance with another embodiment of the invention. In this embodiment, a method 700 of encoding geographical positioning information within a portable document format (PDF) file is shown.

The method 700 begins at block 702, in which geographic information is extracted from a digital source map. In the embodiment shown in FIG. 7, PDF_Proc 806a can extract or otherwise receive a subset of geographic information such as features and objects from a digital source map 100 stored in a database, memory, or other type of data storage device. The subset can include, but is not limited to, graphical representations of various geographical information such as features and objects such as source map data 102 defined within a polygon 104. For example, a user can select a particular rectangular or polygonal-shaped portion of source map data 102 in a digital source map 100. Such user-selected data is also called "selected source map data" and can include geographical information such as features and objects with associated geographical coordinates for each of the features and objects.

Block 702 is followed by block 704 in which information associated with the features and objects is extracted or otherwise received. In the embodiment shown in FIG. 7, PDF_Proc 806a can extract or otherwise receive non-geographical information such as textual information from a database associated with the digital source map 100. Textual information associated with the features and objects contained within the subset defined at block 702 can be extracted or otherwise received for processing with the selected features and objects. The textual information can also be associated with the selected source map data 102. Note that the database can be the same database or a separate database, memory, or data storage device as described at block 702.

In one embodiment, an associated table can be generated by PDF_Proc 806a for storing the extracted or otherwise received information. The table can be stored in a database, memory, or another data storage device such as database 828.

Block 704 is followed by block 706, in which parameters associated with geographic projection and datum from the digital source map are extracted or otherwise received. In the embodiment shown in FIG. 7, PDF_Proc 806a can extract or otherwise receive parameters defining the geographic projection and datum associated with the digital source map 100 of interest. These parameters are ordinarily used to create the digital source map 100, and can be extracted or otherwise received by PDF_Proc 806a. PDF_Render 806b can then utilize such parameters to create a corresponding electronic graphics file for the selected source map data 102.

In one embodiment, PDF_Proc 806a can store the extracted or otherwise received information in the database, memory, or other data storage device used by the PDF_Proc 806a to store textual information at block 704.

Block 706 is followed by block 708, in which geographic coordinates of the extracted data are determined. In the embodiment shown in FIG. 7, PDF_Proc 806a can extract or otherwise receive the geographical coordinates of the polygon 104 containing the selected source map data 102. For example, PDF_Proc 806a can determine the geographical coordinates for a lower most point, a left most point, an upper most point, and a right most point for a polygon 104. Such points can be respectively referred to as "OriginX," "OriginY," "MaxX," and "MaxY." Depending on the shape of the polygon 104, more than one lower most point, left most point, upper most point, or right most point can exist.

In one embodiment, PDF_Proc 806a can store the geographical coordinates in the database, memory, or other data storage device used by the PDF_Proc 806a to store textual information at block 704, and the parameters stored at block 706.

Block 708 is followed by block 710, in which the extracted data is rendered to a portable document format (PDF) file. In the embodiment shown in FIG. 7, PDF_Render 806b can utilize the geographic coordinates determined at block 708 amd the parameters determined at block 706 to render a graphic in a PDF file which corresponds to the polygon 104 containing the selected source map data 102.

Block 710 is followed by block 712, in which corresponding PDF coordinates are determined from the geographical coordinates of the selected source map data 102. From the rendered graphic in the PDF file, PDF_Proc 806a can determine corresponding PDF coordinates of the rendered graphic such as the rendered PDF graphic 316 shown in FIG. 3. For example, PDF_Proc 806a can determine the PDF coordinates of the lower most and left most point of the rendered PDF graphic 316. Depending on the shape of the rendered graphic, more than one lower most or left most point can exist.

Block 712 is followed by block 714, in which the angle between the north/south axis of the digital source map and the north/south axis of the rendered PDF graphic is optionally determined. In the embodiment shown in FIG. 7, PDF_Proc 806a can optionally determine an angle between the north/south axis of the digital source map 100 and the north/south axis of the rendered PDF graphic 316. The angle determined by PDF_Proc 806a can also be referred to as the "Angle." The angle can be stored by PDF_Proc 806a for subsequent processing. In one embodiment, information previously associated with the GEODict, or other dictionary entry, can provide similar information to the angle, or the angle can otherwise be derived, calculated, or determined from such information.

Block 714 is followed by block 716, in which a ratio of the distance between two points in the digital source map and the corresponding points in rendered PDF graphic can be determined. In the embodiment shown in FIG. 7, PDF_Proc 806a can determine via the GEODict, or other dictionary entry, a ratio between the distance between two geographical coordinates in the digital source map 100 and the distance between the two corresponding PDF coordinates in the rendered PDF graphic 316. The ratio can be stored by PDF_Proc 806a for subsequent processing. For example, PDF_Proc 806a can determine a ratio between a north/south axis in the source map data 102 and a north/south axis in the rendered PDF graphic 316. The ratio can be referred to as the "ScaleX." PDF_Proc 806a can determine a ratio between an east/west axis in the source map data 102 and an east/west axis in the rendered PDF graphic 316. The ratio can be referred to as the "ScaleY."

Block 716 is followed by Block 718, in which values associated with the rendered PDF graphic are encoded into a dictionary entry. In the embodiment shown in FIG. 7, PDF_Render 806b encodes information associated with the rendered PDF graphic 316 or otherwise previously determined at the above blocks 702-716 into a transformation matrix associated with a dictionary entry associated with the PDF file. For example, the dictionary entry can be "GEODict" shown in FIG. 2, or another dictionary entry such as "LGIDict." PDF_Render 806b can store the information and dictionary entry with the PDF file for subsequent retrieval and processing, such as in the rendered PDF file 826 in database 824.

Block 718 is followed by block 720, in which remaining digital source map coordinates are converted to PDF coordinates. In the embodiment shown in FIG. 7, PDF_Proc 806a can utilize the encoded information in the dictionary entry, such as GEODict, to convert the geographical coordinates of the selected source map data 102 of the digital source map 100 to PDF coordinates of the rendered PDF graphic 316. In one embodiment, the conversion can be performed by PDF_Render 806b using a matrix transformation described above as "ProjectionToPDF."

Block 720 is followed by block 722, in which PDF annotations are generated within the rendered PDF file for each feature or object for which non-geographical such as textual information has been extracted. Note that a person skilled in the art will recognize the processes, methods, or devices needed to generate an annotation in a PDF file. In the embodiment shown in FIG. 7, PDF_Proc 806a retrieves the textual information associated with each feature or object in selected source map data 102 of the digital source map 100, and generates an annotation as needed. An annotation can include some or all of the non-graphic information. For example, for a recreation center of interest in a particular set of source map data as shown in FIG. 5, an annotation such as "TABLE_ Recreation Sites, NAME: Civic Center, ADDRESS: 548 S. Marietta Parkway, CITY: Marietta, PHONE: (770) 528-8450, DESCRIPTION: Exhibit Hall, Arts Center" can be generated. In other embodiments, other types of annotations can be used with suitable types of graphics-type file formats and electronic graphics files. Using coordinates determined above at block 720, PDF_Render 806b can generate an annotation at the particular coordinate location in the rendered PDF graphic for the textual information associated with a feature or object at the coordinate location. In this manner, a user interested in a particular coordinate location in the rendered PDF graphic can select the coordinate location. If needed, GEO_Display 806c can retrieve coordinates of the particular coordinate location from database 824, and display via a client device 818, 820 the coordinates associated with the particular coordinate location. When needed, Attribute_Display 806d can retrieve the annotation from the rendered PDF graphic or from database 828, and display via a client device 818, 820 the non-graphic information associated with the particular coordinate location.

For example, a user operating a client device 818, 820 can view a rendered PDF file 826 using an associated display device or other output device. Utilizing an input device such as a mouse, the user can select a particular geographic object or feature of interest, such as icon 500 in FIG. 5, located at a coordinate location within a rendered PDF file, such as 826 in FIG. 8. A selection can be made by hovering an associated indicator over the icon 500 or annotation 502 shown in FIG. 5. Non-graphic information or attributes, such as annotation information 504 in FIG. 5, associated with the particular geographic object or feature, such as icon 500, can then be retrieved from within the rendered PDF file 826, or can otherwise be retrieved from an associated non-graphic database, such as 828 in FIG. 8. By way of example, non-graphic information such as annotation information 504 can be output or otherwise displayed as a pop-up window adjacent to the geographic object or feature 500.

Block 722 is followed by block 724, in which the method 700 ends.

FIG. 8 is an illustration of a system 800 in accordance with various embodiments of the invention. The system 800 can operate in a networked computer environment. A server such as a mapping engine 802 can include a processor 804 which can execute a software application programs 806 and/or associated modules such as PDF_Proc 806a, PDF_Render 806b, GEO_Display 806c, and Attribute_Display 806d. Note that in the embodiment shown in FIG. 8, these application programs and associated modules are client-executed software application programs.

The processor 804 executes computer-executable program instructions stored in an associated memory. Such processors may comprise a microprocessor, an ASIC, and state machines. Such processors comprise, or may be in communication with, media, for example computer-readable media, which stores instructions that, when executed by the processor 804 cause the processor 804 to perform the steps described herein. Embodiments of computer-readable media include, but are not limited to, an electronic, optical, magnetic, or other storage or transmission device capable of providing a processor, such as the processor 804 of client 818, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, Python, Perl, and JavaScript.

The mapping engine 802 can communicate with one or more databases or storage devices such as a CAD database 808, a GIS land base 810, a raster database 812, and/or a map database 814. Other databases, memory, or data storage devices can also operate with the mapping engine 802 in accordance with various embodiments of the invention. Furthermore, the mapping engine 802 can also communicate with a network such as the Internet 816, an intranet, or another similar type of network. Through a database or network such as the Internet 816, the mapping engine 802 can receive various data inputs from a digital map source 100 shown in FIG. 1, such as source map data 102, polygon data, projection data, angle data (optional), and attribute data. Other types of source map data or digital map data can also be derived, ascertained, or otherwise received by the mapping engine 802 in accordance with various embodiments of the invention.

One or more clients 818, 820 can be in communication with the mapping engine 802, either through direct connectivity or via a network such as the Internet 816, wireless communications, or another communications-type network. Each client 818, 820 can execute a graphics-file format reader program 822 such as Adobe Acrobat Reader® or other type of graphics-type file format viewing or reading program. In other embodiments, other suitable application programs can be executed on each client 818, 820 to view, read, or otherwise access a graphics-type file format or electronic graphics file. Each client 818, 820 can also be associated with various input devices such as a mouse, keyboard, or pointer device. An output device such as a display device can also be associated with each client 818, 820.

Database 824 can store one or more rendered PDF files 826 and associated dictionary entries such as Table 2, other graphics-type file formats, and electronic graphics files for subsequent retrieval. A non-graphics database 828 can store textual information for subsequent retrieval. Other components can operate in conjunction with or otherwise be present in the system 800 shown in accordance with various embodiments of the invention.

Examples of embodiments of the invention implemented in a real world environment are described as follows.

EXAMPLE 1

One example of an application of the invention to a situation in the real world can involve the conversion of an area of the Eastern seaboard of the United States, such as a portion of the state of Maryland. The area can be a previously stored digital source map from the United States Census Bureau "Tiger" landbase, stored in ESRI shapefile format. The area can be converted to single, geo-registered PDF file, with the inclusion of descriptive information associated with navigational aids within that area. In this case, the Tiger landbase for the state of Maryland can be projected from the Tiger NAD 83 datum to UTM zone 18. A subset of the resultant projection can then be extracted by PDF_Proc 806a, using a polygon defined to include the area bounded on the north by latitude 38.9746 degrees, on the south by latitude 38.7265 degrees, on the east by longitude −76.2033 and on the west by longitude −76.6308. An additional data file can also be created by PDF_Proc 806a containing the values for projection and parameters and the ProjectionToPDF matrix encoded in the dictionary entry GEODict. In addition, non-graphic data such as textual information about individual navigational aids can be extracted by PDF_Proc 806a from a United States Coast Guard database, and can be formatted for inclusion in the PDF file. Such non-graphic data or textual information can include the name, position, characteristics, height, structure and remarks describing each navigational aid device. PDF_Proc 806a can then call PDF_Render 806b to create graphics of the PDF file, and can provide boundary values of the graphic for inclusion within the dictionary entry GEODict. The PDF file, dictionary entry GEODict, and information from the navigational database can than be combined by PDF_Render 806b to create a single, geo-registered PDF file. A user operating a client device 818, 820 can execute an application program such as Acrobat Reader®, and the application program modules GEO_Display 806c, and Attribute_Display 806d to retrieve the PDF file 826 from the database 824, and display the rendered PDF map, the latitude and longitude of any point in a displayed graphic of the PDF file as well as the textual information associated with the navigational aids.

EXAMPLE 2

Another use of the invention in the real world can involve the creation of maps which depict particular cartographical features of a portion of the northwest area of the state of Georgia along with customer locations, electrical cabling, transformers, fuses and other electrical equipment deployed in the area by various electrical distribution entities. In this case, data can be stored in the form of one or more AutoCAD® DWG drawing files and a Microsoft Access® database file, with each DWG file representing a single map. All maps can be stored using Georgia West 1002 State Plane coordinates, projected from the NAD 83 datum. From each of the DWG files, PDF_Proc 806a can determine the coordinates of an entire map of the Northwest portion of the state of Georgia, and can create a data file containing the values for projection and parameters and the ProjectionToPDF matrix to be stored in the dictionary entry LGIDict. PDF_Proc 806a can then extract non-graphic attributes of each equipment object contained in the map, along with coordinates of the objects in the map. Next, PDF_Proc 806a can extract information from the Microsoft Access® database relating to each of the customer's equipment contained in the map, including the coordinates of the customers' location. PDF_Render 806b can then call and render the DWG file to a PDF file. Finally, PDF_Proc 806a embeds the dictionary entry LGIDict, and the associated customer and equipment data in the rendered PDF file. A user operating a client device 818, 820 can execute an application program such as Acrobat Reader®, and the application program modules GEO_Display 806c, and Attribute_Display 806d to retrieve the PDF file 826 from the database 824, and display the map in the rendered PDF file 826, the northings and eastings, and information about customers and equipment as desired.

While the above description contains many specifics, these specifics should not be construed as limitations on the scope of the invention, but merely as exemplifications of the disclosed embodiments. Those skilled in the art will envision many other possible variations that within the scope of the invention as defined by the claims appended hereto.

The claimed invention is:

1. A method of incorporating in at least one electronic graphics file at least one first mapping system in at least one storage medium, comprising:

storing, in the at least one storage medium, mapping system information in the at least one electronic graphics file, the mapping system information comprising projection information and datum information, wherein the projection information comprises mathematical information that transforms coordinates of features on the Earth's three-dimensional surface to coordinates on a two-dimensional surface, and wherein the datum information comprises parameters and control points used to accurately define a three-dimensional shape of the Earth;

storing, in the at least one storage medium, geo-registration information in the at least one electronic graphics file, the geo-registration information comprising information used to accurately transform the coordinates from the two-dimensional surface to a coordinate system of the electronic graphics file; and storing, in the at least one storage medium, neatline information describing geographic boundary information of a region of the coordinate system of the electronic graphics file to which the geo-registration applies;

wherein the mapping system information, the geo-registration information, and the neatline information enables graphics information to be self-contained in the at least one electronic graphics file and to be associated with map information in at least one second mapping system, the at least one second mapping system different from the at least one first mapping system.

2. The method of claim 1, further comprising:

generating at least one annotation associated with non-graphic information;

storing the at least one annotation in the at least one electronic graphics file, where the at least one annotation is associated with at least one geographic position in the at least one electronic graphic file;

receiving at least one selection of the at least one annotation, and displaying the non-graphic information associated with the at least one geographic position.

3. The method of claim 1, wherein the map information comprises at least one user selection of source map data from at least one digital source map.

4. The method of claim 3, wherein the map information comprises: at least one longitude, at least one latitude, at least one elevation, at least one terrain feature, at least one set of geographic coordinates, at least one geographic feature, at least one road, at least one body of water, at least one mountain, at least one place, at least one land mass, or geographic information, or any combination thereof.

5. The method of claim 3, wherein the at least one digital source map comprises: at least one digital map, at least one CAD drawing, at least one GIS landbase, at least one raster-based image, at least one database, at least one data storage device, at least one memory, or at least one digital map stored in a data storage device, or any combination thereof.

6. The method of claim 1, further comprising scaling the map information to render corresponding map information in the at least one electronic graphics file, the scaling further comprising: determining the projection information and the datum information determining at least one size associated with the map information; rendering the map information to at least one format associated with the at least one electronic graphics file; determining at least one size associated with the rendered map information in the at least one electronic graphics file; and determining at least one angle between the map information and the rendered map information in the at least one electronic graphics file; determining at least one ratio between the size of the map information and the size of the rendered map information in the at least one electronic graphics file; and based in part on at least the projection information and the datum information, the at least one angle, and the at least one ratio, determining corresponding coordinates in the at least one format associated with the at least one electronic graphics file for at least one portion of the coordinates associated with the map information.

7. The method of claim 1, wherein the map information in the electronic graphics file is geo-registered.

8. The method of claim 1, wherein the at least one electronic graphics file comprises: at least one Adobe Acrobat.RTM. portable document file, at least one portable document format file, at least one design web format (DWF) file, at least one tagged image file format (TIF) file, at least one scalable vector graphics (SVG) file, at least one Bentley Digital InterPlot (DPR) file, and at least one hypertext markup language (HTML) file, or at least one extensible markup language (XML) file, or any combination thereof.

9. The method of claim 1, wherein the at least one electronic graphics file comprises: at least one file format viewable by at least one viewer, at least one file format viewable by at least one file reader application program, or at least one file format viewable by at least one application program adapted to display graphics files or any combination thereof.

10. The method of claim 2, wherein generating at least one annotation associated with non-graphic information from the at least one digital source map comprises: encoding non-graphic information associated with the map information into the at least one electronic graphics file.

11. The method of claim 2, wherein the at least one annotation comprises: at least one hyperlink to at least one database in communication with at least one network, textual information associated with at least one geographical feature in the at least one electronic graphics file, or textual information associated with at least one object in the at least one electronic graphics file, or any combination thereof.

12. The method of claim 3, wherein the non-graphic information comprises: information from the at least one digital source map, or information from at least one database, or any combination thereof.

13. The method of claim 1, further comprising:
storing, in at least one storage medium, display preference information, comprising alternate mapping system information;
transforming coordinates of the electronic graphics file to the alternate coordinate system; and
transforming and displaying coordinates of the electronic graphics file to any other coordinate system for which a transformation algorithm is available.

14. A system for incorporating in at least one electronic graphics file at least one first mapping system in at least one storage medium, comprising:

at least one server coupled to at least one network;
at least one user terminal coupled to the at least one network;
at least one application coupled to the at least one server and/or the at least one user terminal, wherein the at least one application is configured for:
storing, in the at least one storage medium, mapping system information in the at least one electronic graphics file, the mapping system information comprising projection information and datum information, wherein the projection information comprises mathematical information that transforms coordinates of features on the Earth's three-dimensional surface to coordinates on a two-dimensional surface, and wherein the datum information comprises parameters and control points used to accurately define a three-dimensional shape of the Earth;
storing, in the at least one storage medium, geo-registration information in the at least one electronic graphics file, the geo-registration information comprising information used to accurately transform the coordinates from the two-dimensional surface to a coordinate system of the electronic graphics file; and
storing, in the at least one storage medium, neatline information describing geographic boundary information of a region of the coordinate system of the electronic graphics file to which the geo-registration applies;
wherein the mapping system information, the geo-registration information, and the neatline information enables graphics information to be self-contained in the at least one electronic graphics file and to be associated with map information in at least one second mapping system, the at least one second mapping system different from the at least one first mapping system.

15. The system of claim 14, wherein the map information in at least one digital source map comprises at least one user selection of source map data from at least one digital source map.

16. The system of claim 15, wherein the geographic information comprises: at least one longitude, at least one latitude, at least one elevation, at least one terrain feature, at least one set of geographic coordinates, at least one geographic feature, at least one road, at least one body of water, at least one mountain, at least one place, at least one land mass, or geographic information, or any combination thereof.

17. The system of claim 15, wherein the digital source map comprises: at least one digital map, at least one CAD drawing, at least one GIS landbase, at least one raster-based image, at least one database, at least one data storage device, at least one memory, or at least one digital map stored in a data storage device, or any combination thereof.

18. The system of claim 14, wherein the application is further configured for: scaling the map information to render corresponding map information in the at least one electronic graphics file, the scaling further comprising: determining the projection information and the datum information determining at least one size associated with the map information; rendering the map information to at least one format associated with the at least one electronic graphics file; determining at least one size associated with the rendered map information in the at least one electronic graphics file; and determining at least one angle between the map information and the rendered map information in the at least one electronic graphics file; determining at least one ratio between the size of the map information and the size of the rendered map information in the at least one electronic graphics file; and based in part on at least the projection information and the datum information, the at least one angle, and the at least one ratio, determining corresponding coordinates in the at least one format associated with the at least one electronic graphics file for at least one portion of the coordinates associated with the map information.

19. The system of claim 18, wherein the map information in the at least one electronic graphics file is geo-registered.

20. The system of claim 14, wherein the at least one electronic graphics file comprises: at least one Adobe Acrobat.RTM. portable document file, at least one portable document format file, at least one design web format (DWF) file, at least one tagged image file format (TIF) file, at least one scalable vector graphics (SVG) file, at least one Bentley Digital InterPlot (DPR) file, and at least one hypertext markup language (HTML) file, or at least one extensible markup language (XML) file, or any combination thereof.

21. The system of claim 14, wherein the at least one electronic graphics file comprises: at least one file format viewable by at least one viewer, at least one file format viewable by at least one file reader application program, or at least one file format viewable by at least one application program adapted to display graphics files or any combination thereof.

22. The system of claim 14, further comprising generating an annotation for the map information in the at least one electronic graphics file, the generating comprising: encoding non-graphic information associated with the map information into the at least one electronic graphics file.

23. The system of claim 14, wherein the at least one annotation comprises: at least one hyperlink to at least one database in communication with at least one network, textual information associated with at least one geographical feature in the at least one electronic graphics file, or textual information associated with at least one object in the at least one electronic graphics file, or any combination thereof.

24. The system of claim 14, wherein the application is further configured for:
- storing, in at least one storage medium, display preference information, comprising alternate mapping system information;
- transforming coordinates of the electronic graphics file to the alternate coordinate system; and
- transforming and displaying coordinates of the electronic graphics file to any other coordinate system for which a transformation algorithm is available.

* * * * *